United States Patent [19]
Ko

[11] Patent Number: 6,004,704
[45] Date of Patent: Dec. 21, 1999

[54] METHOD OF MAKING A COLOR FILTER APPARATUS

[75] Inventor: Byung Soo Ko, Seoul, Rep. of Korea

[73] Assignee: LG. Philips LCD Co., Ltd., Seoul, Rep. of Korea

[21] Appl. No.: 09/033,929

[22] Filed: Mar. 3, 1998

[30] Foreign Application Priority Data

Dec. 3, 1997 [KR] Rep. of Korea ..................... 97-65440

[51] Int. Cl.$^6$ ............................. G02B 5/20; G02F 1/1335
[52] U.S. Cl. ................................................. 430/7; 430/328
[58] Field of Search .......................................... 430/7, 328

[56] References Cited

U.S. PATENT DOCUMENTS

| | | | |
|---|---|---|---|
| 4,425,416 | 1/1984 | Ogawa | 430/7 |
| 5,279,913 | 1/1994 | Van Doorn | 430/7 |
| 5,482,803 | 1/1996 | Ishiwata et al. | 430/7 |
| 5,514,502 | 5/1996 | Wakata et al. | 430/7 |
| 5,667,920 | 9/1997 | Chiulli et al. | 430/7 |

*Primary Examiner*—John A. Mcpherson
*Attorney, Agent, or Firm*—Graham & James LLP

[57] ABSTRACT

A method of making a color filter apparatus prevents the formation of residual portions of resist film used to form a plurality of different color filters included in the color filter apparatus. In the method of forming the color filter apparatus, a surface treatment of a transparent substrate is carried out between the steps of sequentially forming red, green and blue filters on the upper portion of the transparent substrate. The surface treatment prevents the formation of residual portions of resist films at the time of forming the filters.

5 Claims, 3 Drawing Sheets

Fig.3 GLASS →
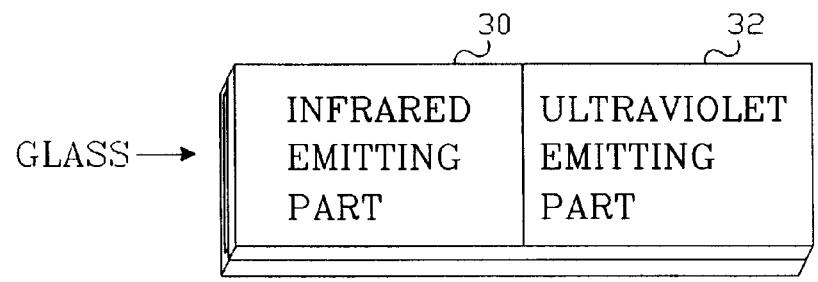
Fig.4
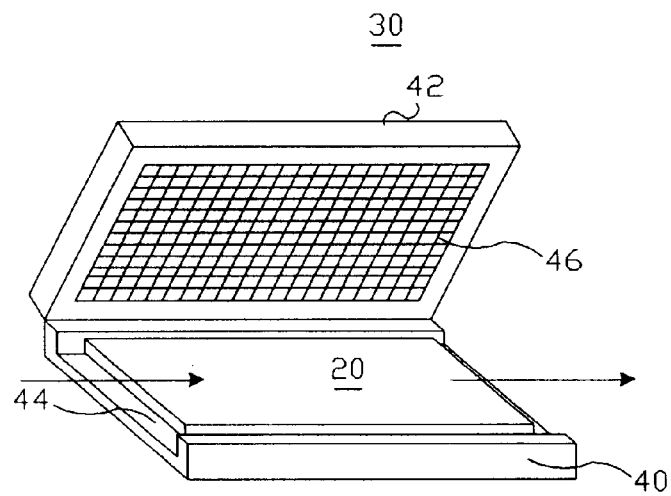
Fig.5
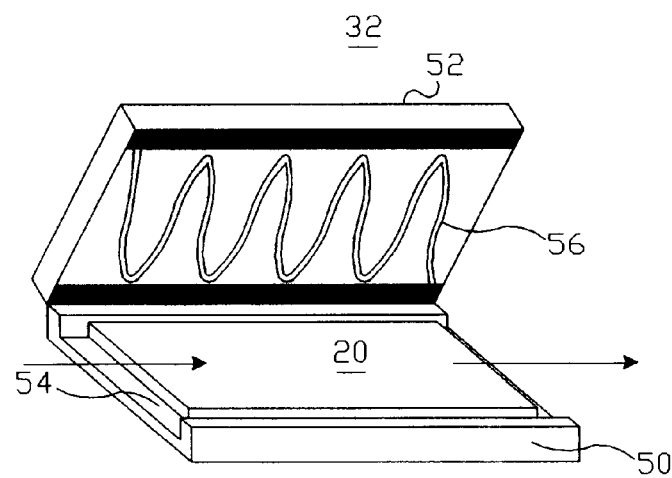

METHOD OF MAKING A COLOR FILTER APPARATUS

BACKGROUND OF THE INVENTION

1. Field of the Invention

This invention relates to a method of making a picture display device, and more particularly to a method of making a color filter apparatus having a plurality of red filters, a plurality of green filters and a plurality of blue filters.

2. Description of the Prior Art

Generally, a picture display apparatus, such as a liquid crystal display (LCD), separates three primary color light signals, i.e., red(R), green(G) and blue(B) color light signals, from a light signal generated by a light source in order to display a color picture. Accordingly, the picture display apparatus is provided with a color filter apparatus in which a plurality of R filters for transmitting red light signals, a plurality of G filters for transmitting green light signals and a plurality of B filters for transmitting blue light signals are provided in each picture element (or pixel element).

In order to prevent deterioration of a picture displayed on the picture display apparatus and to prevent an undesired spreading or mixing of color, the R, G and B filters must be fabricated in such a manner to avoid being overlapped with respect to one another in the color filter apparatus.

As shown in FIG. 1(A) to FIG. 1(D), a color filter apparatus is fabricated by sequentially forming black matrix stripes 12, first filters 14 (i.e., R filters), second filters 16 (i.e., G filters) and third filters 18 (i.e., B filters) on the surface of a transparent glass substrate 10. Each of the first, second and third filters 14, 16 and 18 is formed by providing a corresponding color resist film so as to have a uniform thickness on the entire surface of the glass substrate 10 and then selectively exposing the resist film to light, and thereafter by developing the selectively exposed resist film.

In the method of fabricating the color filter apparatus in this manner, unremoved residual portions 15, 17 or 19 of the color resist films used for forming the respective filters 14, 16 and 18 remain on the periphery of the glass substrate 10. Thus, during the process of forming filters 14, 16 and 18, residual portions 15, 17 and 19 from each of the corresponding filters 14, 16 and 18, respectively, may remain on the surfaces of other filters and/or an area to be occupied by other filters. More specifically, when the first filter 14 is formed, the residual portion 15 of the first filter 14 is located on an area to be occupied by the second and third filters 16 and 18; when the second filter 16 is formed, a residual portion 17 of the second filter 16 is located on both surfaces of the first filter 14 and the area to be occupied by the third filter 18; and when the third filter 18 is formed, a residual portion 19 of the third filter 18 remains on the surfaces of the first and second filters 14 and 16.

Since the residual portions 15, 17 and 19 of the filters 14, 16, and 18 partially shut out a light signal transmitted via the filters, the transmissivity and the color revival rate in the filters 14, 16 and 18 is irregular. This results in a deterioration of a picture displayed on the display apparatus and a spreading or mixing of color in a picture display apparatus having the color filter apparatus. Moreover, in a liquid crystal display apparatus incorporating the color filter apparatus that seals the liquid crystal along with a thin film transistor substrate, the residual portions weaken an adhesion strength of the transparent electrodes to the black matrix stripes to thereby tear the sealed liquid crystal.

SUMMARY OF THE INVENTION

To overcome the problems described above, the preferred embodiments of the present invention provide a method of making a color filter apparatus in which residual portions of a plurality of color filters of the color filter apparatus are prevented from being formed.

A method of making a color filter apparatus according to a preferred embodiment of the present invention includes the steps of providing a transparent substrate; forming first, second and third color filters on the transparent substrate while intermittently performing a step of surface treating an upper portion of the transparent substrate between the steps of forming the first, second and third color filters.

A method of making a color filter apparatus according to another preferred embodiment of the present invention includes the steps of providing a transparent substrate; surface treating the transparent substrate; forming a plurality of first primary color filters on the surface of the surface-treated transparent substrate; surface treating the transparent substrate on which the plurality of first primary color filters have been formed; forming a plurality of second primary color filters on the surface of the transparent substrate in such a manner such that the second primary color filters are adjacent to the first primary color filters; surface treating the transparent substrate on which the plurality of first and second primary color filters have been formed; and forming a plurality of third primary color filters on the surface of the transparent substrate in such a manner that the third primary color filters are arranged to be disposed between the first primary filters and the second primary filters.

A method of making a color filter apparatus according to another preferred embodiment of the present invention includes the steps of providing a transparent substrate, forming a plurality of black matrix stripes on the transparent substrate, surface treating the transparent substrate on which the plurality of black matrix stripes are formed; forming a plurality of first primary color filters on the surface of the surface-treated transparent substrate; surface treating the transparent substrate on which the plurality of first primary color filters have been formed; forming a plurality of second primary color filters on the surface of the transparent substrate in such a manner that the second primary color filters are adjacent to the first primary color filters; surface treating the transparent substrate on which the first and second primary color filters have been formed; and forming a plurality of third primary color filters on the surface of the transparent substrate in such a manner that the plurality of third primary color filters are arranged to be located between the first primary filters and the second primary filters.

BRIEF DESCRIPTION OF THE DRAWINGS

These and other features, advantages and elements of the present invention will be apparent from the following detailed description of preferred embodiments of the present invention with reference to the accompanying drawings, in which:

FIG. 3 is a schematic view of a light emitting apparatus for irradiating a light onto a glass substrate for use in the methods of the preferred embodiments of the present invention;

FIG. 4 is a detailed view of the infrared emitting apparatus shown in FIG. 3; and FIG. 5 is a detailed view of the ultraviolet emitting apparatus shown in FIG. 4.

DETAILED DESCRIPTION OF PREFERRED EMBODIMENTS

Figure 1:
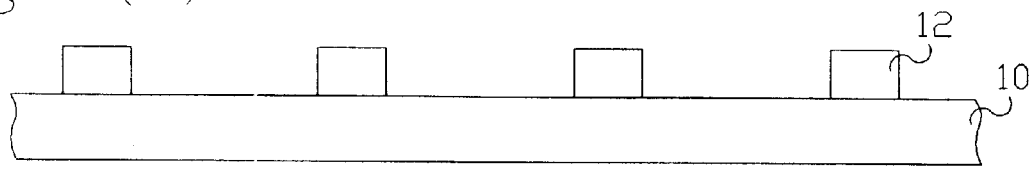
FIG. 1(A) is a section view illustrating a first step in a conventional method of forming a color filter apparatus.
FIG. 1(B) is a section view illustrating a second step in a conventional method of forming a color filter apparatus.
FIG. 1(C) is a section view illustrating a third step in a conventional method of forming a color filter apparatus.
FIG. 1(D) is a section view illustrating a fourth step in a conventional method of forming a color filter apparatus.
Figure 1:
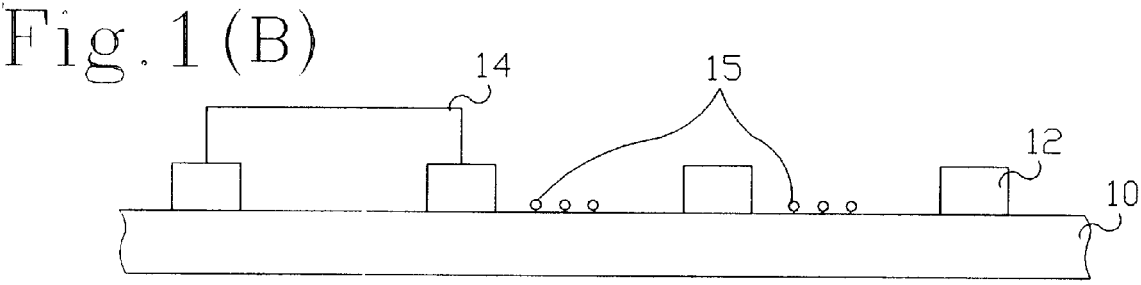
Figure 1:
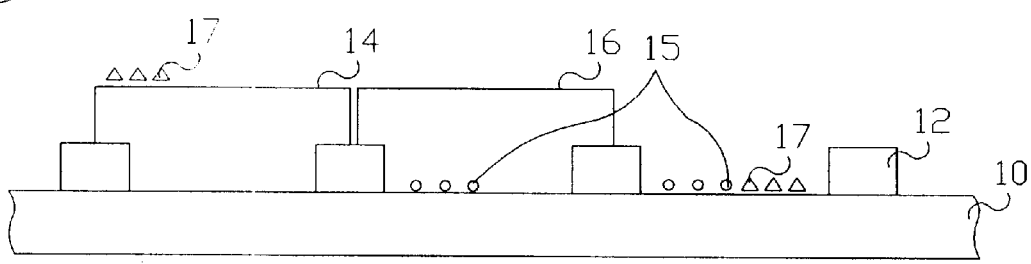
Figure 1:
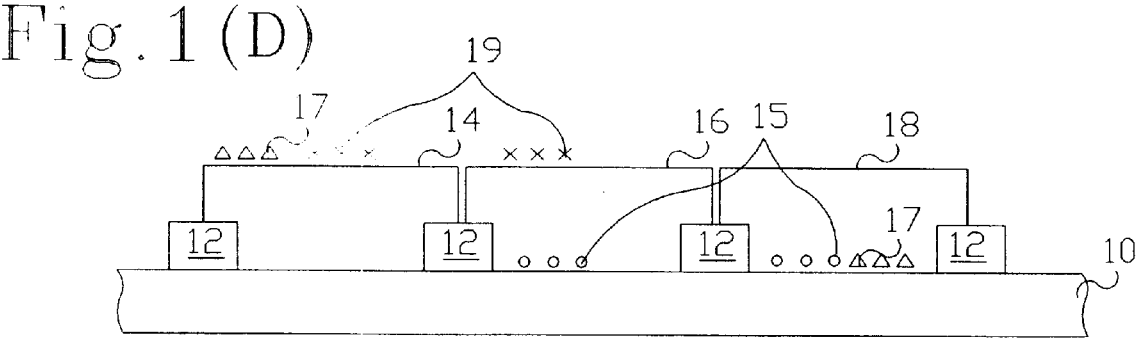
Figure 2:
FIG. 2(A) is a section view illustrating a first step of a method of forming a color filter apparatus according to a preferred embodiment of the present invention.
FIG. 2(B) is a section view illustrating a second step of a method of forming a color filter apparatus according to a preferred embodiment of the present invention.
FIG. 2(C) is a section view illustrating a third step of a method of forming a color filter apparatus according to a preferred embodiment of the present invention.
FIG. 2(D) is a section view illustrating a fourth step of a method of forming a color filter apparatus according to a preferred embodiment of the present invention.
FIG. 2(E) is a section view illustrating a fifth step of a method of forming a color filter apparatus according to a preferred embodiment of the present invention.
FIG. 2(F) is a section view illustrating a sixth step of a method of forming a color filter apparatus according to a preferred embodiment of the present invention.
FIG. 2(G) is a section view illustrating a seventh step of a method of forming a color filter apparatus according to a preferred embodiment of the present invention.
Figure 2:
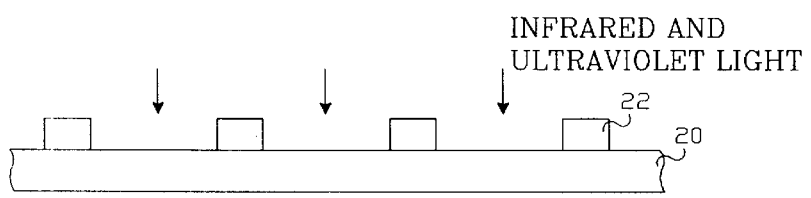
Figure 2:
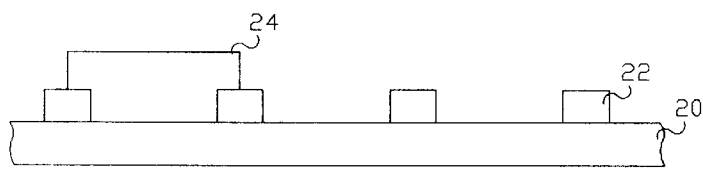
Figure 2:
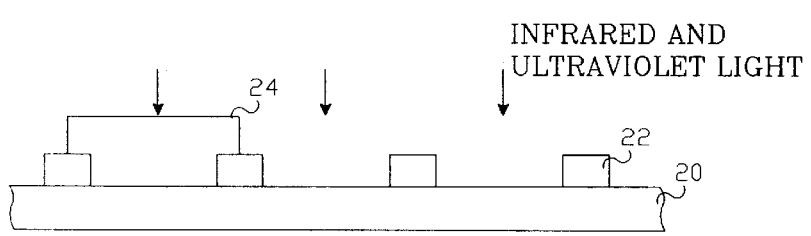
Figure 2:
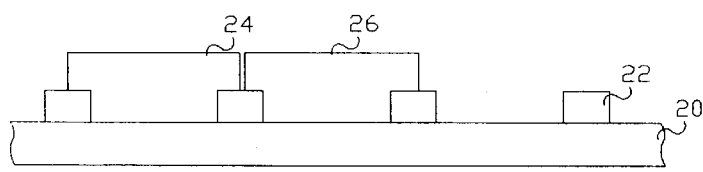
Figure 2:
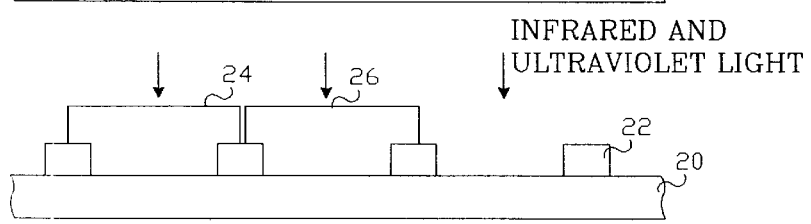
Figure 2:
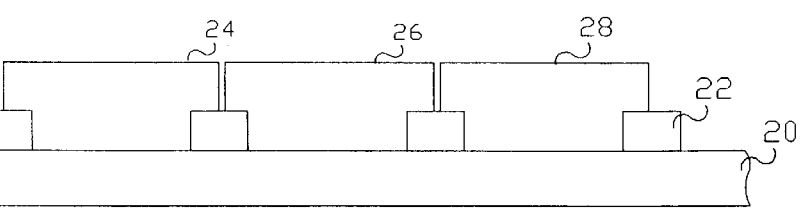

FIGS. 2(A)–2(G) are section views for explaining a method of making a color filter apparatus according to a preferred embodiment of the present invention.

Referring to FIG. 2(A), a color filter apparatus includes a glass substrate 20. A plurality of black matrix stripes 22 are formed on a surface of the glass substrate 20. The black matrix stripes 22 are preferably formed by coating an opaque resin and an opaque metal, such as chrome, on the surface of the glass substrate 20 and then patterning the opaque material membrane so as to form the plurality of black matrix stripes 22. The black matrix stripes 22 formed in this way divides the surface of the glass substrate 20 into a plurality of cell areas in which filters are to be disposed while also preventing a light interference between the cell areas.

As shown in FIG. 2(B), the glass substrate 20 on which the black matrix stripes 22 have been formed, is exposed to a surface treating step. More specifically, an infrared light and an ultraviolet light are applied to the upper surface of the substrate 20 having the black matrix stripes disposed thereon for a certain time.

A plurality of first filters 24 are formed as shown in FIG. 2(C) on the upper portion of the surface-treated glass substrate 20. The plurality of first filters 24 are preferably disposed on a portion of the cell areas divided by the black matrix stripe 22. It is preferable that the first filters 24 are formed at each third cell area. Each of the first filters 24 is preferably formed by coating a resist film in any one color (e.g., red color) of the three primary colors on the upper portion of the glass substrate 20 so as to have a certain desired thickness and then selectively exposing the coated resist film to light, and thereafter by developing the selectively exposed resist film.

Residual portions of the resist film for forming the first filters 24 are not formed and do not remain on the surface of the glass substrate 20 when the development of resist film is finished. This results from an adhesion of the resist film used for forming the first filters 24 to the surface of the glass substrate 20 being weakened by the infrared light and the ultraviolet light applied during the surface treating process shown in FIG. 2(B).

Next, as shown in FIG. 2(D), the glass substrate 20 on which the black matrix stripes 22 and the first filters 24 have been formed, is preferably again exposed to infrared light and ultraviolet light for a certain time, respectively, thereby providing surface treatment of the glass substrate 20 and the first filters 24.

Subsequently, as shown in FIG. 2(E), a plurality of second filters 26 are formed on the upper portion of the glass substrate 20 which was surface-treated together with the first filters 24. The second filters 26 are preferably positioned in the cell areas located adjacent to the first filters 24, respectively. Each of the second filters 26 is preferably formed by coating a resist film in any one color (e.g., green color) of the three primary colors on the upper portion of the glass substrate 20 to have a certain thickness and then selectively exposing the coated resist film to light, and thereafter by developing the selectively exposed resist film.

Residual portions of the resist film used to form the second filters 26 do not remain or exist in either the surfaces of the glass substrate 20 or the surfaces of the first filters after development of the resist film used for forming the second filters 26 has been completed. This results from an adhesion of the resist film used for forming the second filters 26 to the surface of the glass substrate 20 and the surfaces of the first filters 24 being weakened by the infrared light and the ultraviolet light applied during the second surface treatment step shown in FIG. 2(D).

Finally, as shown in FIG. 2(F), the glass substrate 20 on which the black matrix stripes 22 and the first and second filters 24 and 26 have been formed, is preferably exposed to infrared light and the ultraviolet light for a certain time, respectively, thereby providing a surface treatments of the glass substrate 20 and the first and second filters 24 and 26.

Subsequently, as shown in FIG. 2(G), a plurality of third filters 28 are formed on the upper portion of the glass substrate 20.which was surface-treated together with the first and second filters 24 and 26. The third filters 28 are preferably positioned in the cell areas adjacent to the second filters 26, respectively. Each of the third filters 28 is preferably formed by coating a resist film in the remaining color (e.g., blue color) of the three primary colors which is different from the color of the first and second filters 24 and 26 on the upper portion of the glass substrate 20 so as to have a certain thickness and then selectively exposing the coated resist film to light, and thereafter by developing the selectively exposed resist film.

Residual portions of the resist film used to form the third filters 28 do not remain or exist on the surfaces of the first and second filters 24 and 26 when the third filters 28 have been formed. This results from an adhesion of the resist film used to form the third filters to the surfaces of the first and second filters 24 and 26 being weakened by the irradiation of the infrared light and the ultraviolet light applied in the surface treatment step shown in FIG. 2(F).

Referring now to FIG. 3, there is shown a light emitting apparatus for irradiating an infrared light and an ultraviolet light onto the surface of the glass substrate 20 in FIG. 2(B), FIG. 2(D) and FIG. 2(E). The light emitting apparatus preferably includes an infrared ray emitting part 30 and an ultraviolet ray emitting part 32 which are arranged in parallel with an integral structure.

The infrared emitting part 30 includes a first body 40 and a first cover 42 as shown in FIG. 4. The first body 40 is provided with a first guide recess 44 that allows the glass substrate 20 in FIG. 2 to be moved in the horizontal direction. An infrared light source 46 is installed on the inner side of the first cover 42. The infrared light source 46 irradiates an infrared light onto the glass substrate 20 as the substrate 20 is moved along the first guide recess 44.

On the other hand, the ultraviolet emitting part 32 includes a second body 50 and a second cover 52 as shown in FIG. 5. The second body 50 is provided with a second guide recess 54 that allows the glass substrate 20 in FIG. 2 to be moved in the horizontal direction. The second guide hole 54 is preferably arranged with the first guide recess 44 in a straight line, thereby allowing the glass substrate 20 to be successively moved from the left side of the infrared emitting part 30 into the right side of the ultraviolet emitting part 32.

An ultraviolet lamp 56 is installed in the inner side of the second cover 52. The ultraviolet lamp 56 irradiates an ultraviolet light onto the glass substrate 20 as it is moved along the second guide recess 54.

As described above, in a method of making a color filter apparatus according to the preferred embodiments of the present invention, since the glass substrate and those of the filters which have already been formed on the glass substrate are surface-treated by infrared and ultraviolet ray lights prior to formation of others of the respective R, G and B filters, residual portions of resist films used to form the filters are not formed and do not remain on the surface of the glass substrate or the surface of the already formed filters. As a result, a method of forming a color filter apparatus according to the preferred embodiments of the present invention prevents the deterioration of a picture and spreading and mixing of color. Also, the color filter apparatus made according to the methods of the preferred embodiments of the present invention prevent tearing of a seal for sealing up a liquid crystal when it is used for a liquid crystal display device.

Although the present invention has been explained with reference to preferred embodiment described above, it should be understood to those of ordinary skill in the art that the invention is not limited to the preferred embodiments disclosed herein, but rather that various changes or modifications thereof are possible without departing from the spirit of the present invention.

For instance, it will be apparent to the skilled person in the art that both an infrared ray and an ultraviolet ray are irradiated in order to provide the surface treatment of the glass substrate and the filters in the present preferred embodiment, but the glass substrate and the filters can be surface-treated using only one of the infrared and ultraviolet rays. Accordingly, the scope of the invention shall be determined only by the appended claims and their equivalents.

What is claimed is:

1. A method of making a color filter apparatus comprising the steps of:

providing a transparent substrate;

forming first, second and third color filters on the transparent substrate while intermittently performing a step of curing the first, second and third color filters to harden the first, second and third color filters and a step of surface treating an upper portion of the transparent substrate between the steps of forming the first, second and third color filters, wherein said step of surface treating includes irradiating an infrared light and an ultraviolet light onto the upper portion of the transparent substrate so as to remove a residual portion of the material used to form the first, second and third color filters.

2. A method of making a color filter apparatus comprising the steps of:

providing a transparent substrate;

surface treating the transparent substrate;

forming a plurality of first primary color filters on the surface of the surface-treated transparent substrate;

curing the plurality of first primary color filters to harden the plurality of first primary color filters;

surface treating the transparent substrate on which the plurality of first primary color filters have been formed;

forming a plurality of second primary color filters on the surface of the surface-treated transparent substrate in such a manner that the second primary color filters are adjacent to the first primary color filters;

curing the plurality of second primary color filters to harden the plurality of second primary color filters:

surface treating the transparent substrate on which the plurality of first and second primary color filters have been formed; and forming a plurality of third primary color filters on the surface of the surface-treated transparent substrate in such a manner that the third primary color filters are arranged to be disposed between the first primary filters and the second primary filters;

curing the plurality of third primary color filters to harden the plurality of third primary color filters; wherein at least one of said steps of surface treating said transparent substrate includes irradiating an infrared light and an ultraviolet light onto the upper portion of the transparent substrate so as to remove a residual portion of the material used to form at least one of the first, second and third color filters.

3. The method of claim 2, wherein said first to third primary color filters are red, green and blue color filters, respectively.

4. A method of making a color filter apparatus comprising the steps of:

providing a transparent substrate;

forming a plurality of black stripes on the transparent substrate, surface treating the transparent substrate on which the plurality of black matrix stripes are formed;

forming a plurality of first primary color filters on the surface of the surface-treated transparent substrate;

curing the plurality of first primary color filters to harden the plurality of first primary color filters;

surface treating the transparent substrate on which the plurality of first primary color filters have been formed;

forming a plurality of second primary color filters on the surface of the surface-treated transparent substrate in such a manner that the second primary color filters are adjacent to the first primary color filters;

curing the plurality of second primary color filters to harden the plurality of second primary color filters;

surface treating the transparent substrate on which the plurality of first and second primary color filters have been formed; and forming a plurality of third primary color filters on the surface of the surface-treated transparent substrate in such a manner that the third primary color filters are arranged to be disposed between the first primary filters and the second primary filters;

curing the plurality of third primary color filters to harden the plurality of third primary color filters; wherein at least one of said steps of surface treating said transparent substrate includes irradiating an infrared light and an ultraviolet light onto the upper portion of the transparent substrate so as to remove a residual portion of the material used to form at least one of the first, second and third color filters.

5. The method of claim 4, wherein said first to third primary color filters are red, green and blue color filters, respectively.

* * * * *